Nov. 17, 1925.   1,562,240
E. E. MELOTTI
AUXILIARY HEATING AND CIRCULATING APPARATUS FOR AUTOMOBILES
Filed Jan. 10, 1925

Inventor:
Ella E. Melotti,
By her attorney,
Charles E. Gooding.

Patented Nov. 17, 1925.

1,562,240

UNITED STATES PATENT OFFICE.

ELLA E. MELOTTI, OF BOSTON, MASSACHUSETTS.

AUXILIARY HEATING AND CIRCULATING APPARATUS FOR AUTOMOBILES.

Application filed January 10, 1925. Serial No. 1,709.

*To all whom it may concern:*

Be it known that I, ELLA E. MELOTTI, a citizen of the United States, residing at Boston, in the county of Suffolk and State of Massachusetts, have invented new and useful Improvements in Auxiliary Heating and Circulating Apparatus for Automobiles, of which the following is a specification.

This invention relates to an improved apparatus for circulating and heating the water in the water circulating system of an automobile.

The object of the invention is to provide an auxiliary means for heating and circulating the water in the water circulating system so that when the internal combustion engine of the automobile is not in operation, this auxiliary system may be utilized in cold weather to keep the water in circulation and to keep it warm, as, for example, when the automobile is left standing outdoors, or when it is kept in an unheated garage.

The advantages derived are two-fold, namely: 1. The water in the circulating system will be prevented from freezing in cold weather, and 2, the engine will be kept warm and will be easy to start.

The invention consists in an auxiliary water heating and circulating apparatus such as hereinafter described in the specification and particularly pointed out in the claims.

Referring to the drawings.

Like numerals refer to like parts throughout the several views of the drawings.

Figure 1:
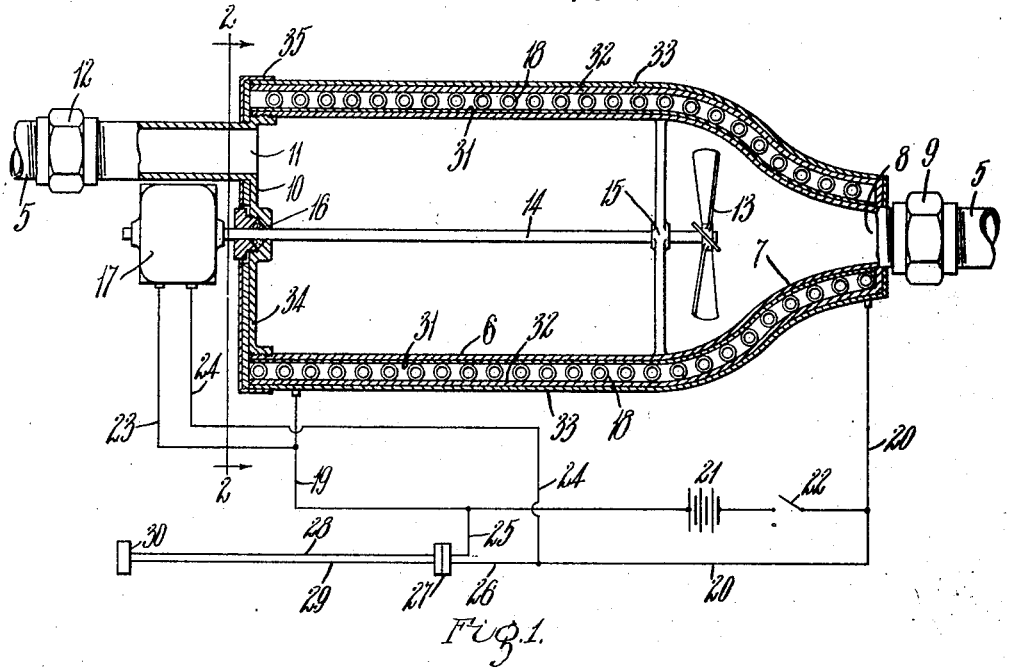
Figure 1 is a sectional elevation of the apparatus of my invention, the electric connections thereto being shown diagrammatically.
Figure 2:
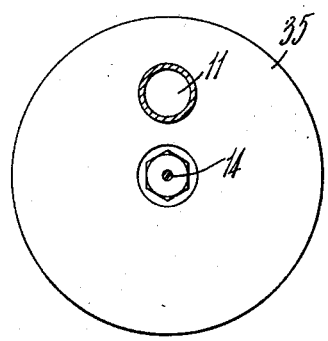
Fig. 2 is a sectional elevation taken on line 2—2, Fig. 1.
Figure 3:
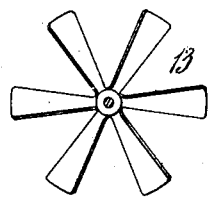
Fig. 3 is a detail front elevation of the propeller.

In the drawings, 5 is the water pipe leading from the standard pump of the automobile water circulating system to the engine casing. 6 is a container for water, circular in cross section, and having a reduced rear end portion 7 provided with a rear end outlet 8 which is connected by a union fitting 9 to the pipe 5.

The front end 10 of the container has an inlet orifice 11 provided therein which is connected by a union 12 to the pipe 5, preferably at a point adjacent the pump of the regular circulating system of an automobile not shown in the drawings, but well known to those skilled in the art. A propeller 13 is provided within the container 6 and is fastened to a shaft 14 rotatably mounted in bearings 15 and 16 in the container and projecting through the bearing 16 is connected to an electric motor 17 located outside the container.

The container 6 is surrounded by a coil of electric wire 18 which is connected by wires 19 and 20 to the storage battery 21 of the automobile in which the device is installed, thus forming an electric circuit in which is provided a switch 22 which may be conveniently located upon the dash of the automobile. Wires 23 and 24 lead from the wires 19 and 20 respectively to the electric motor 17, whereby it may be actuated and thus impart a rotary motion to the propeller 13. Wires 25 and 26 are also provided which connect the wires 19 and 20 respectively to a socket 27 so that when the automobile is standing in a garage, it may be connected by wires 28 and 29 to a socket 30 connected with the electric lighting system of the garage. The walls of the container 6 are surrounded by a layer 31 of suitable insulating material, and outside the coil 18 is another layer of heat insulating material 32 enclosed within an outer casing 33. The front end of the container 6 is closed by a cap 34 and another cap 35 is forced onto the outer casing 33, closing the chamber containing the coil 18.

The operation of the apparatus hereinbefore described is as follows:—If the automobile is standing in the garage, the switch 22 is left open, and the electricity is supplied from the socket 30 through the wires 28 and 29, socket 27, wires 25 and 26 and wires 19 and 20 to the heating coil 18, and at the same time the motor 17 is actuated by an electric current passing through the wires 23 and 24. The motor actuates the propeller 13 through the shaft 14, thus causing the water to circulate through the pipe 5 and through the water circulating system around the engine, and back through the pipe 5 and into the container 6. At the same time this water is heated by the coil 18. If the automobile is standing outdoors, the switch 22 is closed, and the electric current will then pass through the wires 19 and 20 and the battery 21 and through the coil 18 and will also pass through the wires 23 and 24 to actuate the motor, thus obtaining the same results as to heating the water and causing it to circulate throughout the system.

I claim:—

1. An auxiliary liquid heating and circulating apparatus for automobiles comprising a container for liquid having an inlet and an outlet orifice and adapted to be interposed in and connected to a pipe forming a portion of the liquid circulating system of an automobile, a coil of wire surrounding said container and adapted to be connected to a source of electric energy, and means within said container to force the liquid therein through said outlet orifice and pipe.

2. An auxiliary liquid heating and circulating apparatus for automobiles comprising a container for liquid having an inlet and an outlet orifice and adapted to be interposed in and connected to a pipe forming a portion of the liquid circulating system of an automobile, a coil of wire surrounding said container and adapted to be connected to a source of electric energy, a rotary propeller within said container and means to rotate the same to force liquid from said container through said outlet orifice and pipe.

3. An auxiliary liquid heating and circulating apparatus for automobiles comprising a container for liquid having an inlet and an outlet orifice and adapted to be interposed in and connected to a pipe forming a portion of the liquid circulating system of an automobile, a coil of wire surrounding said container and adapted to be connected to a source of electric energy, a rotary propeller positioned within said container adjacent its rear end, a shaft fast thereto and projecting through the front end of said container, and an electric motor connected to said shaft.

4. An internal combustion engine, a liquid circulating system combined therewith, a pump adapted to cause liquid to circulate through said system, and auxiliary means for causing liquid to circulate through said system and including an electric motor.

5. An internal combustion engine, a liquid circulating system combined therewith, a pump adapted to cause liquid to circulate through said system, an auxiliary means for causing liquid to circulate through said system comprising a rotary propeller and an electric motor connected to said propeller.

6. In combination, an internal combustion engine, a liquid circulating system combined therewith, a pump adapted to cause liquid to circulate through said system, and auxiliary means for causing liquid to circulate through said system and for heating the same comprising a container for liquid having an inlet and an outlet orifice and adapted to be interposed in and connected to a pipe forming a portion of said liquid circulating system and a coil of wire surrounding said container and adapted to be connected to a source of electric energy.

7. In combination, an internal combustion engine, a liquid circulating system combined therewith, a pump adapted to cause liquid to circulate through said system and auxiliary means for causing liquid to circulate through said system and for heating the same comprising a container for liquid having a reduced rear end portion and having an inlet orifice at its front end and an outlet orifice at its rear reduced end and adapted to be interposed in and connected at said outlets to a pipe forming a portion of said liquid circulating system of an automobile, and a coil of wire surrounding said container and adapted to be connected to a source of electric energy.

8. In combination, an internal combustion engine, a liquid circulating system combined therewith, a pump adapted to cause liquid to circulate through said system, and auxiliary means for causing liquid to circulate through said system and for heating the same comprising a container for liquid having an inlet and an outlet orifice and adapted to be interposed in and connected to a pipe forming a portion of said liquid circulating system, a coil of wire surrounding said container and adapted to be connected to a source of electric energy, and means within said container to force the liquid therein through said outlet orifice and pipe.

9. In combination, an internal combustion engine, a liquid circulating system combined therewith, a pump adapted to cause liquid to circulate through said system, and auxiliary means for causing liquid to circulate through said system and for heating the same comprising a container for liquid having an inlet and an outlet orifice and adapted to be interposed in and connected to a pipe forming a portion of said liquid circulating system, a coil of wire surrounding said container and adapted to be connected to a source of electric energy, a rotary propeller within said container, and means to rotate the same to force liquid from said container through said outlet orifice and pipe.

10. In combination, an internal combustion engine, a liquid circulating system combined therewith, a pump adapted to cause liquid to circulate through said system, and auxiliary means for causing liquid to circulate through said system and for heating the same comprising a container for liquid having an inlet and an outlet orifice and adapted to be interposed in and connected to a pipe forming a portion of said liquid circulating system, a coil of wire surrounding said container and adapted to be connected to a source of electric energy, a rotary propeller positioned within said container adjacent its rear end, a shaft fast thereto and projecting through the front end of said container, and an electric motor connected to said shaft.

In testimony whereof I have hereunto set my hand.

ELLA E. MELOTTI.